US009807070B2

(12) United States Patent
Ren

(10) Patent No.: US 9,807,070 B2
(45) Date of Patent: Oct. 31, 2017

(54) METHOD, DEVICE, CLIENT AND SERVER FOR INTERACTION

(71) Applicant: Tencent Technology (Shenzhen) Company Limited, Shenzhen, Guangdong (CN)

(72) Inventor: Min Ren, Shenzhen (CN)

(73) Assignee: TENCENT TECHNOLOGY (SHENZHEN) COMPANY LIMITED (CN)

( * ) Notice: Subject to any disclaimer, the term of this patent is extended or adjusted under 35 U.S.C. 154(b) by 0 days.

(21) Appl. No.: 14/271,413

(22) Filed: May 6, 2014

(65) Prior Publication Data

US 2014/0359713 A1    Dec. 4, 2014

Related U.S. Application Data

(63) Continuation of application No. PCT/CN2014/072717, filed on Feb. 28, 2014.

(30) Foreign Application Priority Data

May 30, 2013  (CN) .......................... 2013 1 0211198

(51) Int. Cl.
  *H04L 29/06* (2006.01)
  *H04L 29/08* (2006.01)
(52) U.S. Cl.
  CPC .......... *H04L 63/08* (2013.01); *H04L 63/0807* (2013.01); *H04L 67/20* (2013.01)
(58) Field of Classification Search
  CPC ..... H04L 63/08; H04L 63/0807; H04L 67/20; H04L 63/0823; H04L 63/10;
  (Continued)

(56) References Cited

U.S. PATENT DOCUMENTS 9,022,280 B2 *  5/2015  Goyal .............. G06F 17/30879
                                                              235/375
2010/0241857 A1   9/2010  Okude et al.
(Continued)

FOREIGN PATENT DOCUMENTS

CN    101267625 A    9/2008
CN    101631136 A    1/2010
(Continued)

OTHER PUBLICATIONS

International Searching Authority, The State Intellectual Property Office of P.R. China, Form PCT/ISA/210, 220 & 237 for IA Application No. PCT/CN2014/072717, International Search Report and Written Opinion, Jun. 4, 2014.
(Continued)

*Primary Examiner* — Edward Zee
*Assistant Examiner* — Chi Nguy
(74) *Attorney, Agent, or Firm* — Brainspark Associates, LLC

(57) ABSTRACT

An interaction method, device, client and server are provided. The method includes that: a client scans a target two-dimensional code (for example, a Quick Response code) to acquire a URL of the target two-dimensional code; the client sends the URL to an associated third-party server; the client receives multifunction information returned from the third-party server according to the URL, wherein each piece of the multifunction interaction information includes interaction type information; the client interacts with the third-party server according to the multifunction information. The present disclosure makes it possible that: during scanning a two-dimensional code, a client can directly interact with a third-party server, the interaction applications can simply be acquired via scanning, instead of pre-scanning
(Continued)

and manually initiating an interaction with the scanned contents, such that the operations are simple and convenient.

18 Claims, 11 Drawing Sheets

(58) Field of Classification Search
CPC ....... H04L 63/102; G06F 21/30; G06F 21/31; G06F 21/33; G06F 21/335; G06F 17/30876; G06F 21/62; G06F 21/6218; G06F 21/6272; G06F 21/629
USPC .......................................................... 726/4
See application file for complete search history.

(56) References Cited

U.S. PATENT DOCUMENTS

| | | | |
|---|---|---|---|
| 2012/0036225 A1* | 2/2012 | Chor | H04L 67/02 709/219 |
| 2013/0179156 A1* | 7/2013 | Fried | G06F 17/30002 704/201 |
| 2013/0263211 A1* | 10/2013 | Neuman | H04L 63/08 726/1 |
| 2014/0298293 A1* | 10/2014 | Nishio | G06F 8/30 717/121 |
| 2014/0304077 A1* | 10/2014 | Wingle | G06Q 30/0241 705/14.61 |

FOREIGN PATENT DOCUMENTS

| | | |
|---|---|---|
| CN | 101951592 A | 1/2011 |
| CN | 102438067 A | 5/2012 |
| CN | 102624697 A | 8/2012 |
| CN | 102821104 A | 12/2012 |
| CN | 102917059 A | 2/2013 |
| CN | 103092638 A | 5/2013 |
| EP | 2487875 A2 | 8/2012 |

OTHER PUBLICATIONS

Search Report Accompanying Examiner's Office Action, The State Intellectual Property Office of P.R. China, First Office Action for CN Application No. CN2013102111983, Search Report and Translation, Oct. 17, 2016.

State Intellectual Property Office of P.R. China, Supplemental Search Report (EN Translation) and Office Action or Corresponding Chinese Counterpart Patent Application No. 201310211198.3, dated May 19, 2017.

* cited by examiner

METHOD, DEVICE, CLIENT AND SERVER FOR INTERACTION

CROSS REFERENCE TO RELATED APPLICATIONS

This application is a U.S. continuation application of International Application PCT/CN2014/072717, with an international filing date of Feb. 28, 2014, claiming the priority benefit of Chinese Patent Application No. 201310211198.3 filed on May 30, 2013, the contents of which are both incorporated by reference herein in their entireties for all purposes.

FIELD OF THE PRESENT DISCLOSURE

The present disclosure relates to the field of Internet technology, and in particular, to a method, device, client and server for interaction.

BACKGROUND

Two-dimensional code scanning, which refers to acquiring contents and information from a picture of two-dimensional code by a client application of a mobile terminal, is typically used in areas of barcodes scanning, resources scanning and downloading, and train tickets scanning, etc. As the grown of the two-dimensional code industry, and intellectualization trend of mobile terminals, applications of the two-dimensional code will be more and more popular. People may notice a variety of the two-dimensional code advertisements on billboards of subways or bus stations, for example, two-dimensional code based shopping has been widely applied to outdoor advertising by $1^{st}$ Store, Taobao and Jingdong Mall. The two-dimensional code effectively increases the enjoyment and convenience of participating Marketing activities, so that it attracts a plenty of consumers to join activities of brands, and then an interactive relationship with the brands will be established.

Currently, a way to interact with merchants via two-dimensional code scanning may be: when a user of a mobile terminal requires to scan a two-dimensional code advertisement, a local software for scanning the two-dimensional code on the mobile terminal will be activated to scan the two-dimensional code and obtain contents of the two-dimensional code. If any further interaction operation is needed, the interaction operation with the obtained contents will be started manually, which brings a lot of efforts and complexity to the operation process. For example, when the user wants to call a scanned number, the user still needs to dial the number manually after obtaining the number by scanning.

SUMMARY OF THE PRESENT INVENTION

The embodiments of the present disclosure provide an interaction method, which intends to solve problems that during scanning a two-dimensional code in prior art, the required interaction operations to the scanned contents need to be operated manually, which brings a lot of efforts and complexity to the operation process.

The present embodiments provide the following technical solutions:

In one aspect of the present disclosure, an interaction method is provided, comprising:

scanning, by a client, a target two-dimensional code to acquire a URL in the target two-dimensional code;

sending, by the client, the URL to a third-party server;

receiving, by the client, multifunction interaction information that is returned from the third-party server according to the URL, wherein each piece of the multifunction interaction information includes interaction type information; and interacting, by the client, with the third-party server based on the multifunction interaction information.

In another aspect of the present disclosure, an interaction method is provided, comprising:

receiving, by a third-party server, a URL sent from a client;

sending, by the third-party server, multifunction interaction information to the client according to the URL, wherein each piece of the multifunction interaction information includes interaction type information; and interacting, by the third-party server, with the client based on the multifunction interaction information.

In another aspect of the present disclosure, an interaction device for a client is provided, comprising:

a URL acquiring unit, configured to scan a target two-dimensional code and acquire a URL from the target two-dimensional code;

a URL sending unit, configured to send the URL to an third-party server;

an information receiving unit, configured to receive multifunction interaction information returned from the third-party server according to the URL, wherein each piece of the multifunction interaction information includes interaction type information; and an interaction unit, configured to interact with the third-party server based on the multifunction interaction information.

In another aspect of the present disclosure, a client is provided, comprising the above interaction device.

In the fifth aspect of the present disclosure, another interaction device for a third-party server is provided, comprising:

a URL receiving unit, configured to receive a URL sent from a client;

an information sending unit, configured to send multifunction interaction information to the client according to the URL, wherein each piece of the multifunction interaction information includes interaction type information; and an interaction unit, configured to interact with the client based on the multifunction interaction information.

In another aspect of the present disclosure, a third-party server is provided, comprising the above interaction device.

Compared with prior art in the field, the advantage effect of the present disclosure is: a client scans the target two-dimensional code to acquire a URL of the target two-dimensional code; the client sends the URL to an associated third-party server; the client receives multifunction interaction information returned from the third-party server according to the URL, wherein each piece of the multifunction interaction information includes interaction type information; the client interacts with the third-party server based on the multifunction interaction information. The present disclosure makes it possible that: during scanning a two-dimensional code, a client can directly interact with a third-party server, the interaction applications can simply be acquired via scanning, instead of pre-scanning and manually initiating an interaction with the scanned contents, such that the operations are simple and convenient.

DESCRIPTION OF THE DRAWINGS

To better illustrate the technical solution of embodiments of the present disclosure, brief introductions to the drawings needed to be used in the description of embodiments will be made in the below. It is obvious that the drawings in the following description are but for exemplary embodiments of the present disclosure, and that a person of ordinary skilled in the art may derive additional draws based on these figures under the precondition that not paying creative efforts.

DETAILED DESCRIPTION

To better illustrate the purpose, technical solution and advantages of the present disclosure, in a further step, several embodiments of the disclosure will be detailed described in the below in conjunction with the accompanying drawings. It is should be understood that the object of the embodiments described herein is only to explain the present disclosure, not to limit the present disclosure.

In the embodiment, a client scanning a target two-dimensional code, acquiring URL of the target two-dimensional code, sending the URL to an associated third-party server and receiving multifunction interaction information returned from the third-party server according to the URL, and then the client interacts with the third-party server in accordance with the multifunction interaction information.

The implementation of the present disclosure will be described in detail in connection with the following specific embodiments.

The First Embodiment

Figure 1:
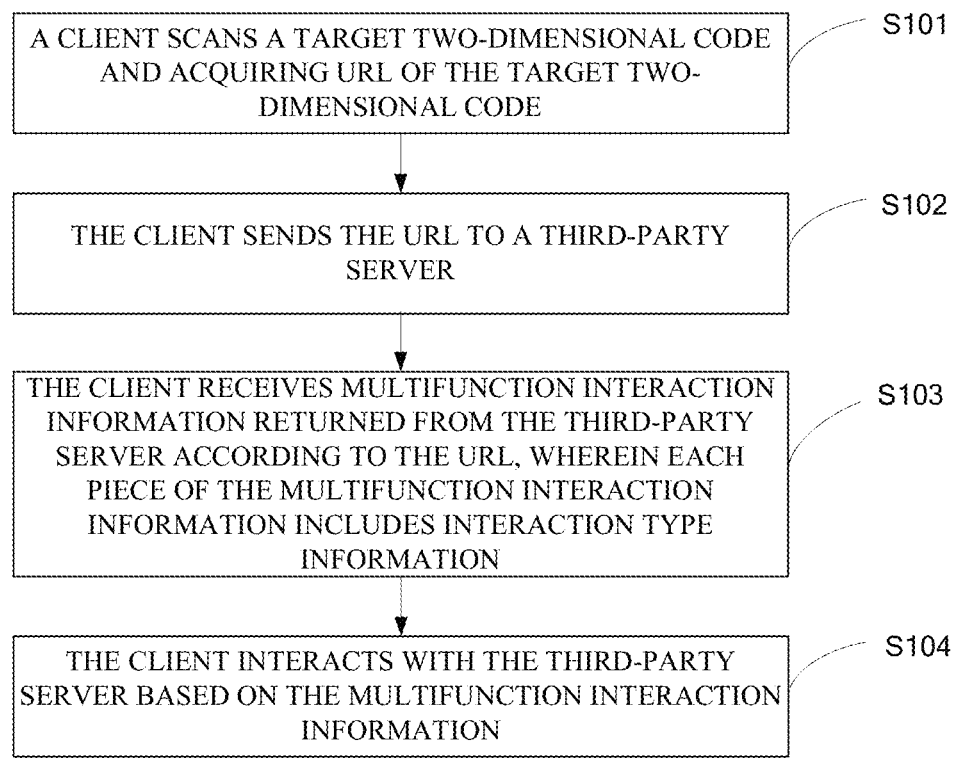
FIG. 1 is a flow chart that illustrates an implementation of an interaction method provided by one embodiment of the present disclosure.

FIG. 1 shows a flow chart of an implementation of an interaction method provided by the first embodiment of the present disclosure, and this interaction method is applied to the client side, the detailed description is as follows:

In step S101, a client scanning a target two-dimensional code and acquiring Uniform Resource Locator (URL) of the target two-dimensional code;

In this embodiment, the client may be a software unit installed on a terminal device, for example, the client may be QQ client, WeChat client or software dedicated for two-dimensional code scanning, etc. And the terminal device may be an intelligent terminal, such as iPhone, android and so on, or other Mobile Internet Devices (MID) and other mobile intelligent terminals, etc.

In this embodiment, the URL actually contained in the two-dimensional code is scanned by a scanning device. The URL is an entrance to interact with the third-party server; the entrance may direct to an interaction interface to be interacted, or may also get to the interaction interface through several jumps. Actually, as the two-dimensional code is carried on a printed medium, or other similar medium, it cannot be modified since published. In order to ensure availability of the two-dimensional code, preferably, there may exist one or more jumps before getting to the interaction interface.

In step S102, the client sending the URL to an associated third-party server;

In the present embodiment, the third-party server corresponds to a server of a subscriber, and each URL is associated with a third-party server.

In step S103, the client receiving multifunction interaction information returned from the third-party server according to the URL, wherein each piece of the multifunction interaction information includes interaction type information and other related information;

In the present embodiment, the interaction applications may be classified as three categories:

the first category of interaction applications are system applications local to the present client; the second category of interaction applications are applications developed by the same developer as the client; and the third category of interaction applications are other webpage applications or APP applications developed by a third-party.

In the present embodiment, there may include one or more interaction types, for example, the interaction application may be voice interaction, SMS interaction, opening a webpage with login state, opening an local APP application of the client, etc. The related information of the interaction application may be information necessary for the interaction application to conduct the interaction operations. Different applications correspond to different contents of related information, for example, the contents may include an interaction application identifier (APPID), an authorized scope of the application, a signature file of a third-party, etc.

In step S104, the client interacts with the third-party server based on the multifunction interaction information.

In the present embodiment, based on the multifunction interaction information, the client may interact with the third-party server in many forms, for example, sending a message by QQ, sending a short message, making a phone call, opening a specified application, opening a webpage with login state, etc.

In the present embodiment, a client scans a target two-dimensional code and acquires a URL of the target two-dimensional code; the client sends the URL to an associated third-party server; the client receives multifunction interaction information returned from the third-party server according to the URL, wherein each piece of the multifunction interaction information includes interaction type information; and then the client interacts with the third-party server based on the multifunction interaction information. The present method makes it possible that: during scanning a two-dimensional code, a client can directly interact with a third-party server, the interaction applications can simply be acquired via scanning, instead of pre-scanning and manually initiating an interaction with the scanned contents, such that the operations are simple and convenient.

The Second Embodiment

Alternatively, after step S130 of the first embodiment, the method may further comprise: displaying options for selecting one type of interaction by a user when the multifunction interaction information includes multiple pieces each corresponding to one type of interaction;

At this moment, step S104 is specified as: the client interacts with the third-party server based on the piece of multifunction interaction information corresponding to the type of interaction selected by the user.

Alternatively, after step S101, the method further comprises: Predefined multifunction interaction identifier is added into the URL at the client, wherein this parameter is used to inform the third-party server that the current client supports multifunction operation;

At this time, step S102 is specified as: the client sends the URL with added predefined multifunction interaction identifier to the third-party server; and when the third-party server supports multifunction operation, the client may receive the multifunction interaction information returned from the third-party server according to the URL.

Figure 2:
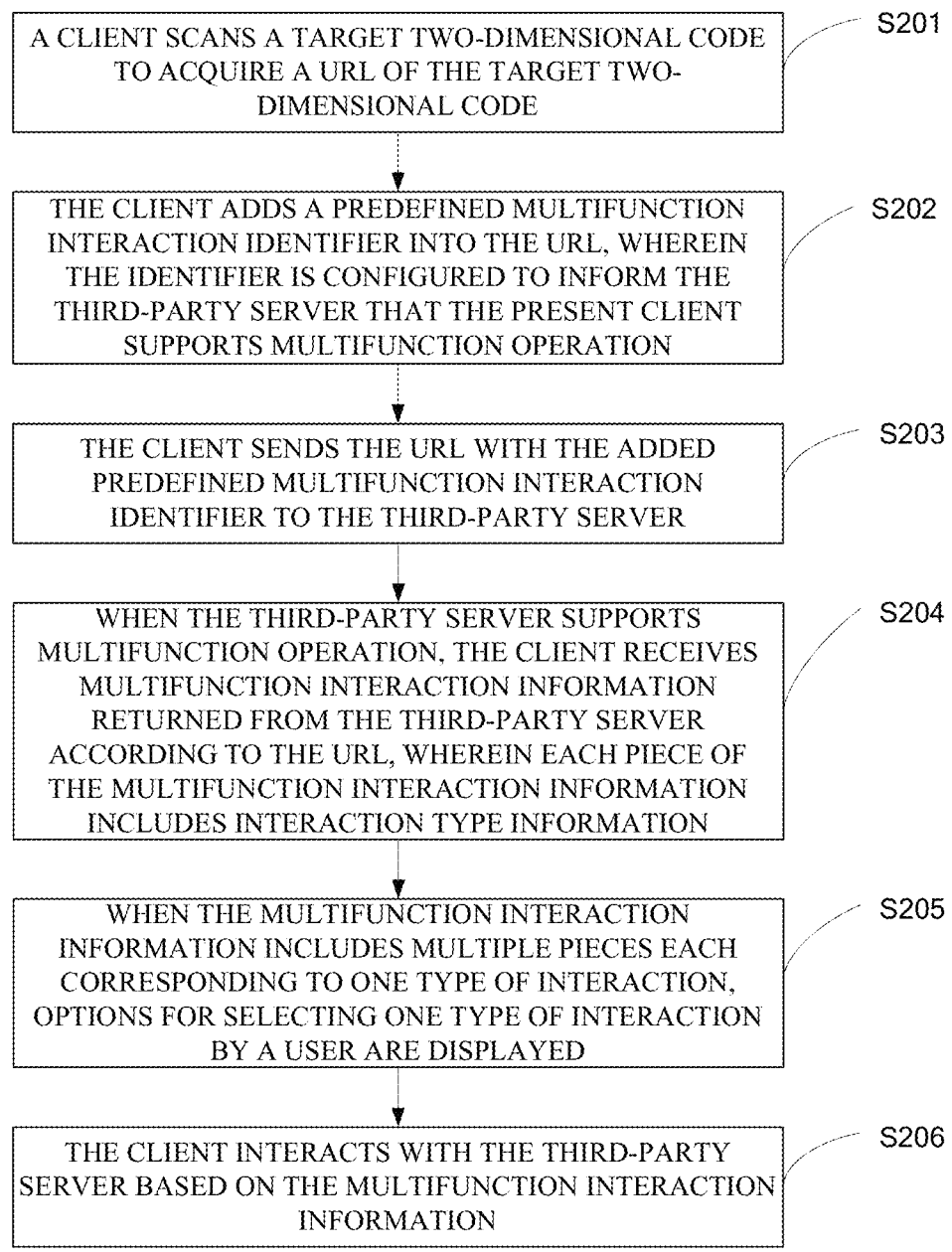
FIG. 2 is a flow chart that illustrates an implementation of an interaction method provided by another embodiment of the present disclosure.

FIG. 2 shows a flow chart of an implementation of an interaction method provided by the second embodiment of the present disclosure, the detailed description is as follows:

In step S201, a client scans a target two-dimensional code and acquires a URL of the target two-dimensional code;

In step S202, the client adds predefined multifunction interaction identifier into the URL, wherein the predefined multifunction interaction identifier used to inform the third-party server that the current client supports multifunction operation;

In the present embodiment, in order to keep the compatibility of the two-dimensional code, a predefined multifunction interaction identifier may be added into the scanned URL, to inform the third-party server that the client supports multiple interaction operations, for example, the URL acquired by scanning is http://www.cctv.com/spring2013.html?key1=value1, and the URL after the addition of the predefined multifunction interaction identifier is http://www.cctv.com/spring2013.html?key1=value1&format=rich.

In step S203, the client sends the URL with the added predefined multifunction interaction identifier to the third-party server. When the third-party server supports multifunction operation, step S204 is executed.

In the present embodiment, when the third-party server supports multifunction operation, the third-party server can interact with the client normally, step S204 is executed; when the third-party server does not support multifunction operation, the third-party server cannot interact with the client normally, so at this moment, the third-party server sends an error message to the client.

In step S204, the client receives multifunction interaction information returned from the third-party server according to the URL, wherein each piece of the multifunction interaction information includes interaction type information;

In step S205, when the multifunction interaction information includes multiple pieces each corresponding to one type of interaction, options for selecting one type of interaction by a user are displayed;

In the present embodiment, the indication may be a menu indication, a list indication, of course, may also be a voice indication or an animation indication, etc.

In the present embodiment, in order to make interaction more effective, multiple types of interaction applications may be provided in the multifunction interaction information, so that the client may select a way of interaction as desired. When the client detects that the received multifunction interaction information includes multiple pieces each corresponding to one type of interaction, it will display options for selecting one type of interaction to the user and the user may select a desired type of interaction in the options displayed by the client, and then step S206 is executed.

In step S206, the client interacts with the third-party server based on the piece of multifunction interaction information corresponding to the type of interaction selected by the user.

In the present embodiment, a client scans a target two-dimensional code and acquires a URL of the target two-dimensional code; the client adds predefined multifunction interaction identifier into the URL and sends the URL with the added predefined multifunction interaction identifier to a third-party server; when the third-party server supports multifunction operation, the client receives multifunction interaction information returned by the third-party server according to the URL; the client interacts with the third-party server based on the multifunction interaction information. This method makes it possible that: during the process of scanning a two-dimensional code, a client can directly interact with a third-party server, the interaction applications can simply be acquired via scanning, instead of pre-scanning and manually initiating an interaction with the scanned contents, such that the operations are simple and convenient.

The Third Embodiment

In the first embodiment, when the interaction type information indicates either a system application local to the client, for example, a call, a SMS, an e-mail, etc., or an application developed by the same developer as the client, for example, when the client application is WeChat developed by Tencent Company, the interaction application may also be QQ, MicroBlog and so on, then step S104 may be specified as:

The client interacts with the indicated type of application locally called by the server by locally calling the same type of application.

For better understanding, the present embodiment is illustrated by the following example implementation, but not limited to the example implementation.

In an example implementation of the disclosure, a call process between the third-party server and the client is taken as an example. At the moment, after the URL is scanned, the following multifunction interaction data information may be returned:

```
{
    "version":"v1.0",      //version
    "type": "phone_call",  //making a call
    "phone":"4008003333"   //phone number of a third-party
}
```

The client determines that the value of "type" is "phone_call" and calls the corresponded local application of the client to call the phone number contained in the "phone" field.

In another example implementation of the disclosure, a SMS process between the third-party server and the client is taken as an example. At the moment, after scanning the URL, the following multifunction interaction data information may be returned:

```
{
    "version":"v1.0"          //version
    "type":"sms"              //sending a short message
    "phone":"100966333"       //messaging platform number of a merchant
}
```

The client determines that the value of "type" is "sms" and calls the corresponded local application of the client to interact with the number contained in the "phone" field via short messages.

In yet another example implementation of the disclosure, a chat on QQ between the third-party server and the client is taken as an example. At the moment, after scanning the URL, the following multifunction interaction data information may be returned:

```
{
    "version":"v1.0",         //QQ version number
    "type":"QQ_WPA",          // a QQ temporary session
    "QQ":"400200333"          // QQ number of a third party
}
```

The client determines that the value of "type" is "QQ_WPA" and calls a local QQ chat window of the client to chat with the QQ number contained in the "phone" field.

In the present embodiment, when the interaction type information indicates a system application local to the client, or an application developed by the same developer as the client application, the corresponded application may be directly called for interaction to acquire the user's login state information.

The Fourth Embodiment

In another situation, when the interaction application in the first embodiment is a webpage application or an APP application developed by a third-party, based on the multifunction interaction information, the interaction in step S104 may be specified as:

the client sends a request for opening a jump URL pointing to the indicated application to the third-party server, so that the third-party server will acquire the user's login state information from an interconnection server according to the request and an authorization token;

the client receives and displays jump webpage returned from the third-party server, which includes the user's login state information;

the client interacts with the third-party server by using the jump webpage;

wherein, the third-party server and the client have been pre-registered on the interconnection server.

In the present embodiment, acquiring the URL of interaction contents from the jump URL, may be specified as: acquiring the jump URL based on the URL directly acquired by scanning the two-dimensional code, and opening the jump URL to obtain actual communication contents. The jump URL can be configured in a variety of forms on the server.

Preferably, after acquiring the user's login state information, the jump webpage information may be re-configured based on the login state information to provide the user particular interaction contents based on the user's features.

Figure 3:
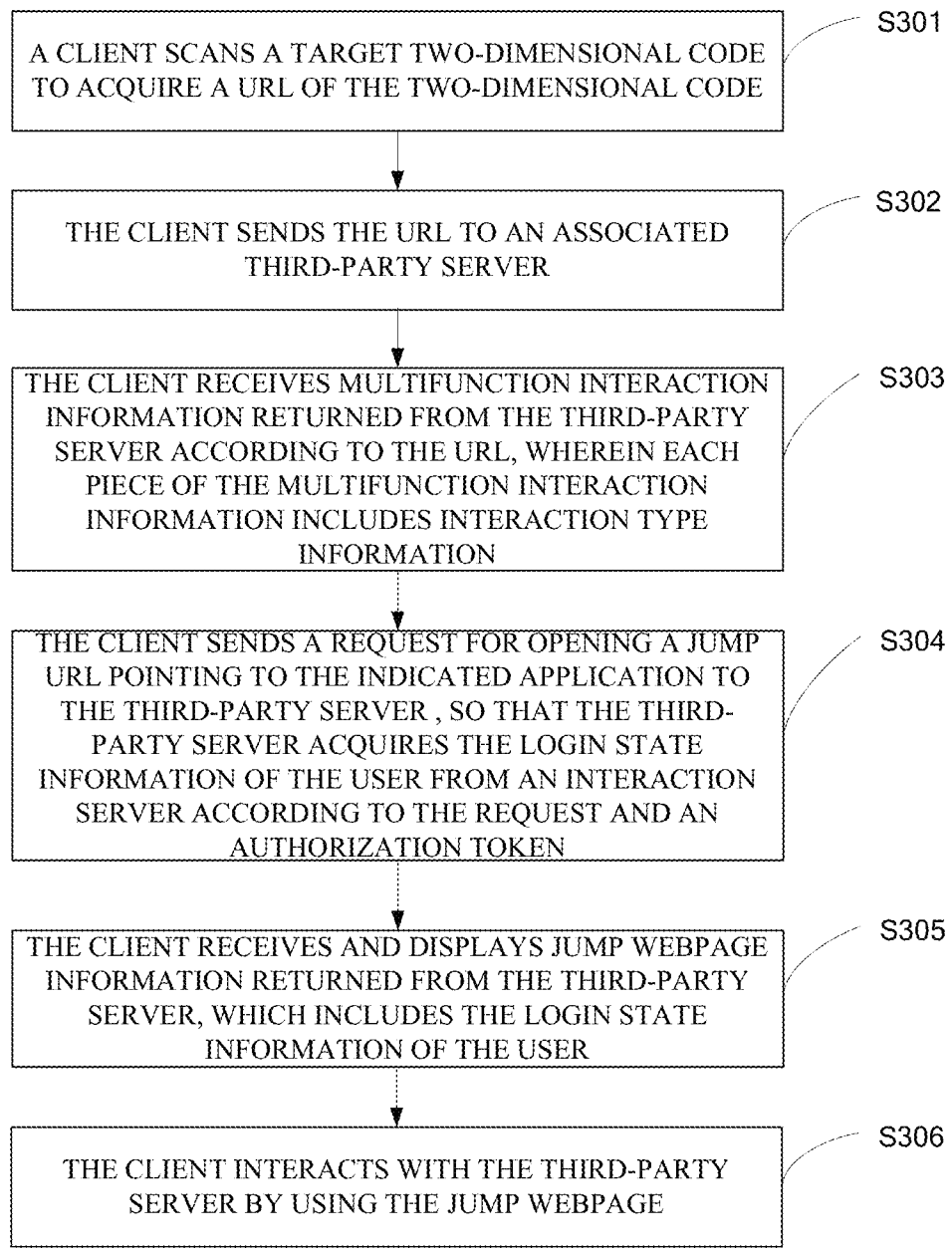
FIG. 3 is a flow chart that illustrates an interaction between a client and a third-party server provided by another embodiment of the present disclosure.

Referring to FIG. 3, shows a flow chart of an interaction between a client and a third-party server provided by the fourth embodiment of the disclosure, wherein the third-party server and the client have been pre-registered on an interconnection server. The third-party server is pre-registered on the interconnection server so as to acquire registration information assigned by the interconnection server, such as the APPID, the APPKey of the APPID, etc., the detailed description is as follows:

in step S301, a client scans a target two-dimensional code and acquires a URL of the target two-dimensional code;

in step S302, the client sends the URL to the associated third-party sever;

in step S303, the client receives multifunction interaction information returned by the third-party server according to the URL, wherein each piece of the multifunction interaction information includes interaction type information;

Optionally, the interaction information further comprises an APPID and/or a signature file of third-party. After step S303, there may be an authentication process a for the third party:

a. the APPID and/or signature file of the third-party are sent from the third party to the interconnection server, so that the interconnection server authenticates the third-party according to the APPID and/or signature file of the third-party.

Wherein, the interconnection server compares the locally stored APPID and/or signature file of the third-party with the received APPID and/or signature file of the third-party which are sent by the client. When the result of the above comparison is consistent, the third-party server corresponding to the third-party is identified as a legitimate server. Otherwise, the third-party server would be identified an illegal server. The authentication can guarantee that the third-party server asking to access the user information of the client is a legitimate server, so as to ensure the security of information related to the user.

Optionally, after step S303, there may also be a confirmation process b of the authorized access:

b. a prompt for authorization sent by the interconnection server is received by the client. The prompt for authorization is used for confirming whether the user of the client permits the third-party server to access information of the user stored on the interconnection server. When a confirmation that permits the third-party server to access information of the user stored on the interconnection server is received, the client sends an authorization confirmation to the interconnection server.

By outputting the prompt for authorization to the user, the user can determine whether to share the personal information with the third-party server as required. Only the information confirmed by the user can be accessed by the third-party server, which further ensures the security of user's data.

Optionally, after step S303, there may also be an authorization code sending process c:

c. the client sends the authorization code to the third-party server, so that the third-party server acquires an authorization token based on the authorization code; the authorization token can be used to acquire the user's login state information directly.

Wherein, c may be specified as:

c1. the client receives the authorization code sent from the interconnection server and forwards the authorization code to the third-party server; or c2. the client generates the authorization code locally, and sends the authorization code to the third-party server.

Optionally, after step S303, there may also be a token sending process d:

d. The interconnection server sends the authorization token to the third-party server.

Wherein, process d may be specified as:

the interconnection server locally generates the authorization token and sends the authorization token to the third-party server.

By utilizing the above authorization code and authorization token, security of the user's data can be further guaranteed.

It should be noted that the processes a, b, c and d are optional processes, and the execution order of these processes may be set in any form to satisfy the purpose of the disclosure, instead of limited to their numerical order.

In step S304, the client sends a request for opening a jump URL pointing to the indicated application to the third-party server, so that the third-party server acquires the client user's login state information from an interconnection server according to the request and an authorization token.

In the present embodiment, the login state information is the user's personal information, which may include the user's nickname, avatar and so on.

In step S305, the client receives and displays jump webpage information returned from the third-party server, which includes the user's login state information.

In the present embodiment, when the client has obtained the jump webpage information including the user's login state information, the client may call a local browser to open the jump webpage. At this moment, the user of the client may view the jump webpage containing the user's login state information.

In step S306, the client interacts with the third-party server by using the jump webpage;

For better understanding, the present embodiment may be described by, but not limited to the following specific example implementation.

Figure 4:
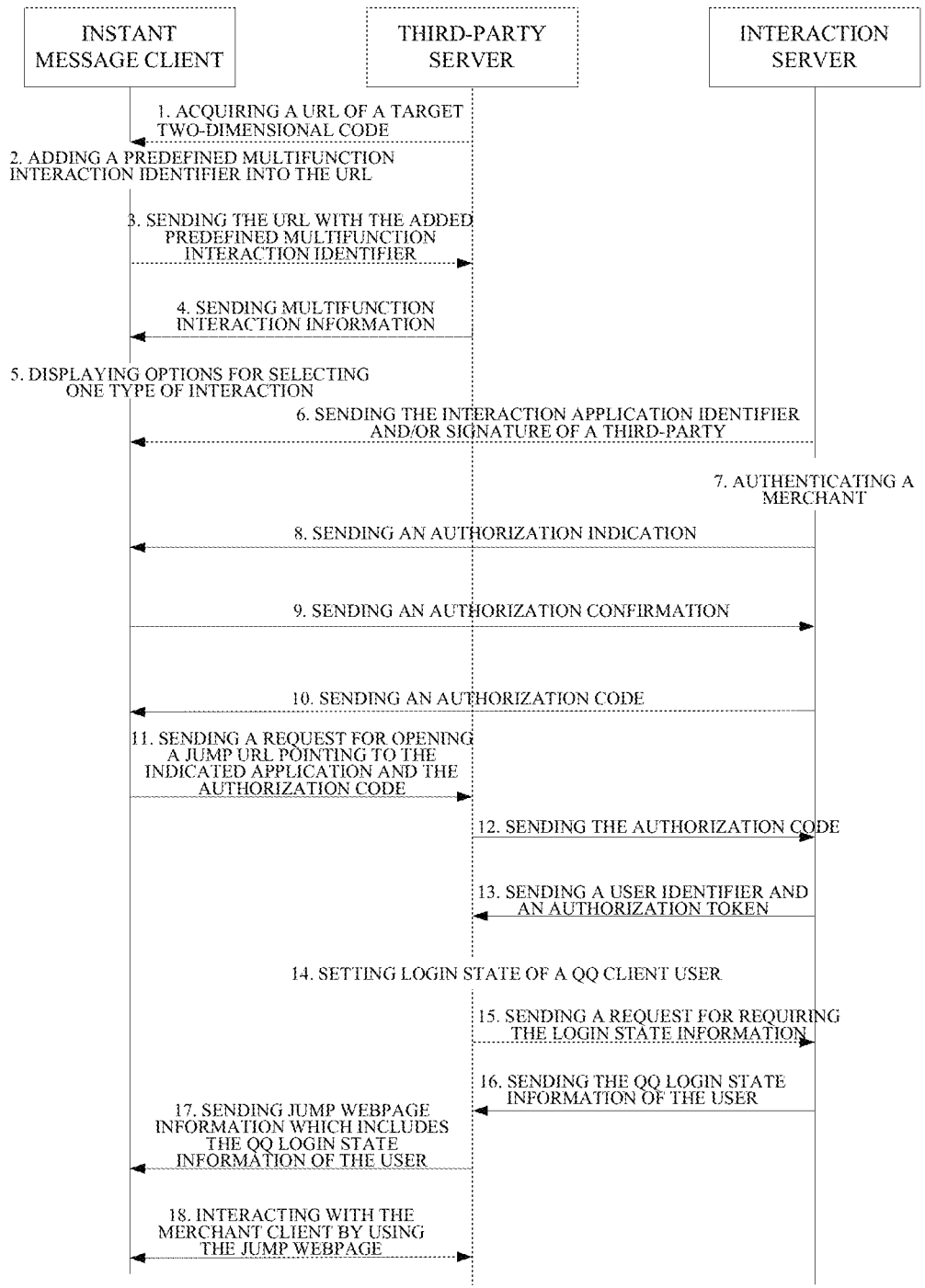
FIG. 4 is a flow chart that illustrates an interaction method provided by another embodiment of the present disclosure.

In an example implementation of the disclosure, the client opening a webpage of the third-party server is taken as an example to illustrate the interaction process of the present embodiment. Referring to FIG. 4, wherein, the third-party server and the client have been pre-registered on the interconnection server, here, assuming that the client is an instant communication client, such as a QQ client and a WeChat client, and that the third-party server may be a merchant server. The detailed process is as follows:

1. An instant communication client scans a target two-dimensional code and acquires a URL of the target two-dimensional code;

2. The instant communication client adds predefined multifunction interaction identifier into the URL;

The predefined multifunction interaction identifier is used to inform the third-party server that the present instant communication client supports multifunction operation, for example, "format=rich" in the webpage http://www.cctv.com/spring2013.html?key1=value1&format=rich is the predefined multifunction interaction identifier.

3. The instant communication client sends the URL with the added predefined multifunction interaction identifier to the third-party server.

When the third-party server supports multifunction operation, step 4 will be executed, in particular, upon the third-party server reads the parameter "format=rich", step 4 will be executed.

4. The third-party server sends multifunction interaction information to the instant communication client according to the URL;

Wherein, each piece of the multifunction interaction information includes interaction type information, for example, the type of the application may be an APPID, and related information of the interaction application may include parameters such as an authorized scope of the application and the redirect_URL of the jump webpage, and the multifunction interaction information is signed by the APPKey of the APPID; the interaction information may be data of Json format:

```
{
    "version":"v1.0", //version number
    "type":"web",  // represent to open the webpage to interact
    "appid":"123456", //interaction application identifier
    "scope":"all", //authorized scope, all means to authorize the accessing to all the information
    "redirect_url":http://www.cctv.com/redirect.php?event=201301234
    // address information of an interaction page
}.
```

5. If the multifunction interaction information includes multiple pieces each corresponding to one type of interaction, the instant communication client may display options for selecting one type of interaction to the user.

6. Based on the piece of multifunction interaction information corresponding to the type of interaction selected by the user, the instant communication client sends the APPID and/or signature file of the third-party to the interconnection server. The multifunction interaction information includes the APPID and/or signature file of the third-party.

7. The interconnection server authenticates the third-party according to the APPID and signature file of the third-party.

Wherein, the interaction information further includes the APPID and/or signature file of the third-party.

8. When the third-party passes the identity authentication, the interconnection server sends a prompt for authorization to the instant communication client;

The prompt for authorization is used for confirming whether the user of the client permits the third-party server to access information of the user stored on the interconnection server.

When a confirmation that permits the third-party server to access information of the user stored on the interconnection server is received, step 9 will be executed.

9. The instant communication client sends an authorization confirmation to the interconnection server.

In the present embodiment, the process of authorizing the access of the third-party server will be described in the following, but not limited to this detailed implementation. Certainly, other ways of implementation may also be applied, for example, the authorization token may be directly acquired without an authorization code.

10. The interconnection server sends an authorization code to the instant communication client.

11. The instant communication client sends a request for opening a jump URL pointing to the indicated application and the authorization code to the third-party server.

In the present embodiment, during sending the request, simultaneously, sending the authorization code to the third-party server.

12. The third-party server sends the authorization code to the interconnection server;

13. Based on the authorization code, the interconnection server sends a user identifier and an authorization token to the third-party server;

14. Based on the user identifier and authorization token, the third-party server locally sets the instant communication client user's login state;

15. The third-party server sends a request for acquiring the login state information to the interconnection server;

16. The interconnection server sends the instant communication client user's login state information to the third-party server;

17. The third-party server sends information of the jump webpage, which includes the instant communication client user's login state information, to the instant communication client.

18. According to the jump webpage information, the instant communication client interacts with the third-party server.

At this moment, the instant communication client may acquire the webpage information with login state.

In another example implementation of the disclosure, an interaction process between an instant communication client and a merchant (the merchant corresponding to the third-party server) through an APP application developed by the merchant is taken as an example. At this moment, after scanning the URL, following multifunction interaction data information may be returned: the type of the application (e.g., APPID) and the related information of the interaction application, which may includes parameters such as, a name of the application, an authorized scope of the application and the redirect_URL. The interaction information may be Json format data:

```
{
    "version":"v1.0",// version number
    "type":"app", // representing the APP to be interacted
    "appid":"123456",// interaction application identifier
    "scope":"all",// an authorized scope
    "redirect_url":"http://www.cctv.com/redirect.php?event=201301234" ,
//opening the website of the application
    "appname":"CCTV",// contents of the application
    "download_url":http://appstore.apple.com/34567.html"//downloading the
URL
}
```

After acquiring the interaction information, the subsequent process is similar as other embodiments. When the instant communication client finds that the content of "type" is "app", the instant communication client opens an application whose "appname" is "CCTV"; if the application is not installed on the terminal device, URL in the "download_url" is opened to download the application.

In the present embodiment, when the interaction type information indicates an APP application or a webpage application developed by a third-party, the client sends a request for opening the jump URL corresponding to the interaction application to the third-party server, so that the third-party server acquires the client user's login state information from the interconnection server according to the request and an authorization token. The client receives and displays the jump webpage information returned from the third-party server with the client use's login state information, and simultaneously, interacts with the third-party server according to the jump webpage information, so that the instant communication client may acquire the application or webpage with login state information.

The Fifth Embodiment

Figure 5:
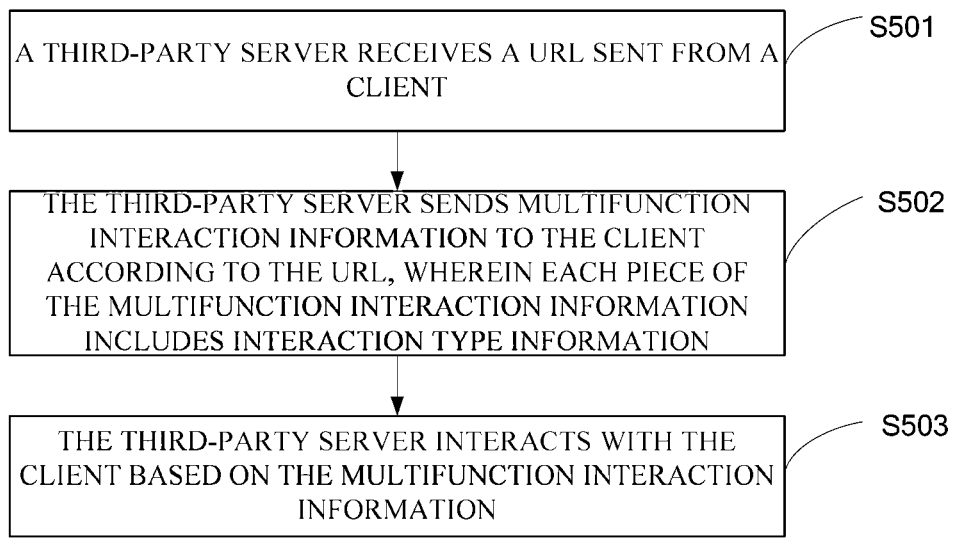
FIG. 5 is a flow chart that illustrates an implementation of an interaction method provided by another embodiment of the present disclosure.

FIG. 5 shows a flow chart of an implementation of an interaction method at the third-party side provided by the fifth embodiment of the disclosure, the detailed description is as follows:

In step S501, a third-party server receives a URL sent from a client;

In step S502, the third-party server sends multifunction interaction information to the client according to the URL, wherein each piece of the multifunction interaction information includes interaction type information.

In the present embodiment, the multifunction interaction information includes information about at least one type of interaction application.

In step S503, the third-party server interacts with the client based on the multifunction interaction information.

In the present embodiment, a third-party server receives a URL sent from a client; the third-party server sends multifunction interaction information to the client according to the URL, wherein each piece of the multifunction interaction information includes interaction type information; the third-party server interacts with the client based on the multifunction interaction information. This method makes it possible that: during scanning a two-dimensional code, a client can directly interact with a third-party server, the interaction applications can simply be acquired via scanning, instead of pre-scanning and manually initiating an interaction with the scanned contents, such that the operations are simple and convenient.

The Sixth Embodiment

Figure 6:
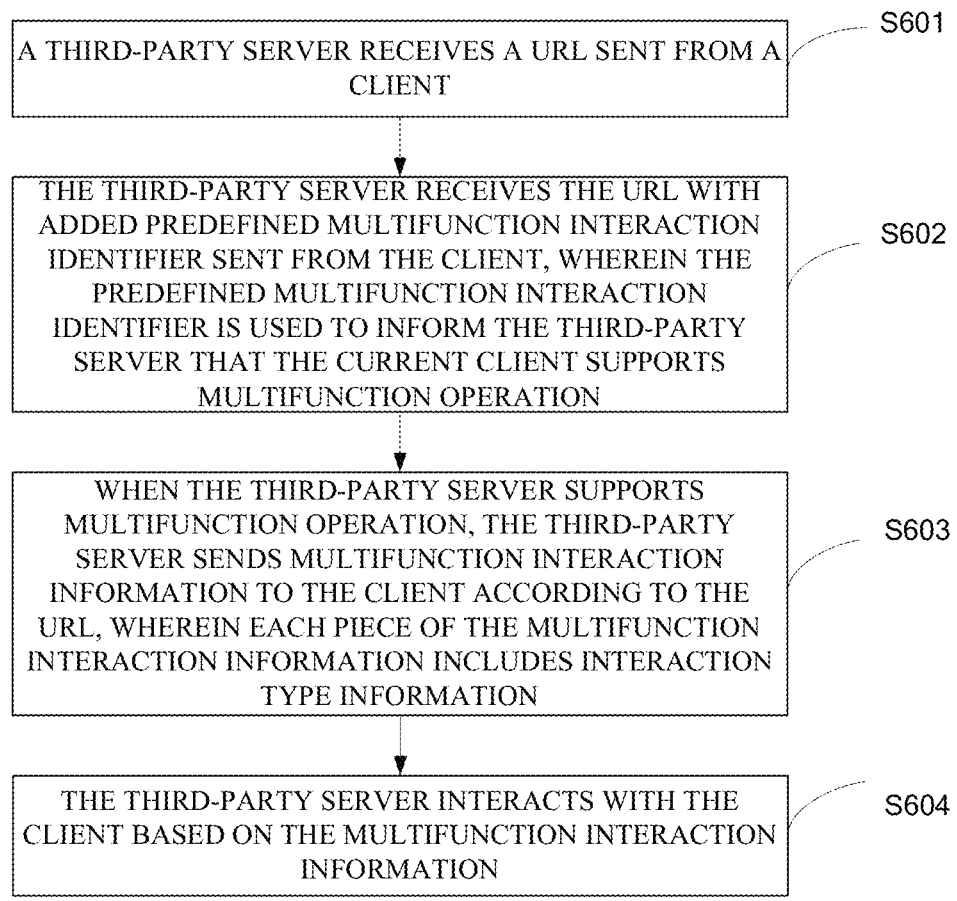
FIG. 6 is a flow chart that illustrates an implementation of an interaction method provided by another embodiment of the present disclosure.

On the basis of the fifth embodiment, FIG. 6 shows a flow chart of an implementation of an interaction method provided by the fifth embodiment of the disclosure, the detailed description is as follows:

In step S601, a third-party server receives a URL sent from a client;

In step S602, the third-party server receives the URL with added predefined multifunction interaction identifier from a client, wherein the predefined multifunction interaction identifier is used to inform the third-party server that the current client supports multifunction operation. When the third-party server supports multifunction operation, step S603 is executed.

In step S603, the third-party server sends multifunction interaction information to the client according to the URL, wherein each piece of the multifunction interaction information includes interaction type information;

In the present embodiment, the multifunction interaction information includes information about at least one the type of interaction application.

In step S604, the third-party server interacts with the client based on the multifunction interaction information.

In the present embodiment, when the third-party server receives the URL with added predefined multifunction interaction identifier from a client, and if the third-party server supports multifunction operation, the multifunction interaction information is sent to the client. Thus, while maintaining the compatibility of the two-dimensional code, it also provides a variety of types and forms for interaction. Additionally, multiple application types may be set, so that the user of the client may select the best interaction way from multiple interaction ways.

The Seventh Embodiment

In the fifth embodiment, if the interaction application is either a system application local to the client, for example, a phone call, a SMS, a mail and so on; or an application developed by the same developer as the client application, for example, when the client is WeChat, the interaction application may be QQ or MicroBlog, etc. then step S503 is specified as:

The application in the third-party server corresponding to the interaction application interacts with the client locally calling application corresponding to the interaction application.

The present embodiment is a method claim on the third-party server side that corresponds to the third embodiment, so the detailed description may refer to the example implementations in the third embodiment.

In the present embodiment, when the interaction type information indicates an local application of the client or an application developed by the same developer as the client, the corresponding application may be directly called to interact to acquire the user's login state information.

The Eighth Embodiment

When the interaction type information indicates an APP application or a webpage application developed by a third-party, step S503 in the fifth embodiment is specified as:

the third-party server receives a request for opening a jump URL pointing to the indicated application from the client;

the third-party server acquires the client user's login state information from an interconnection server according to the request and an authorization token;

the third-party server sends jump webpage information including the client user's login state information to the client, so that the client interacts with the third-party server by using the jump webpage;

wherein, the third-party server and the client have been pre-registered on the interconnection server.

Figure 7:
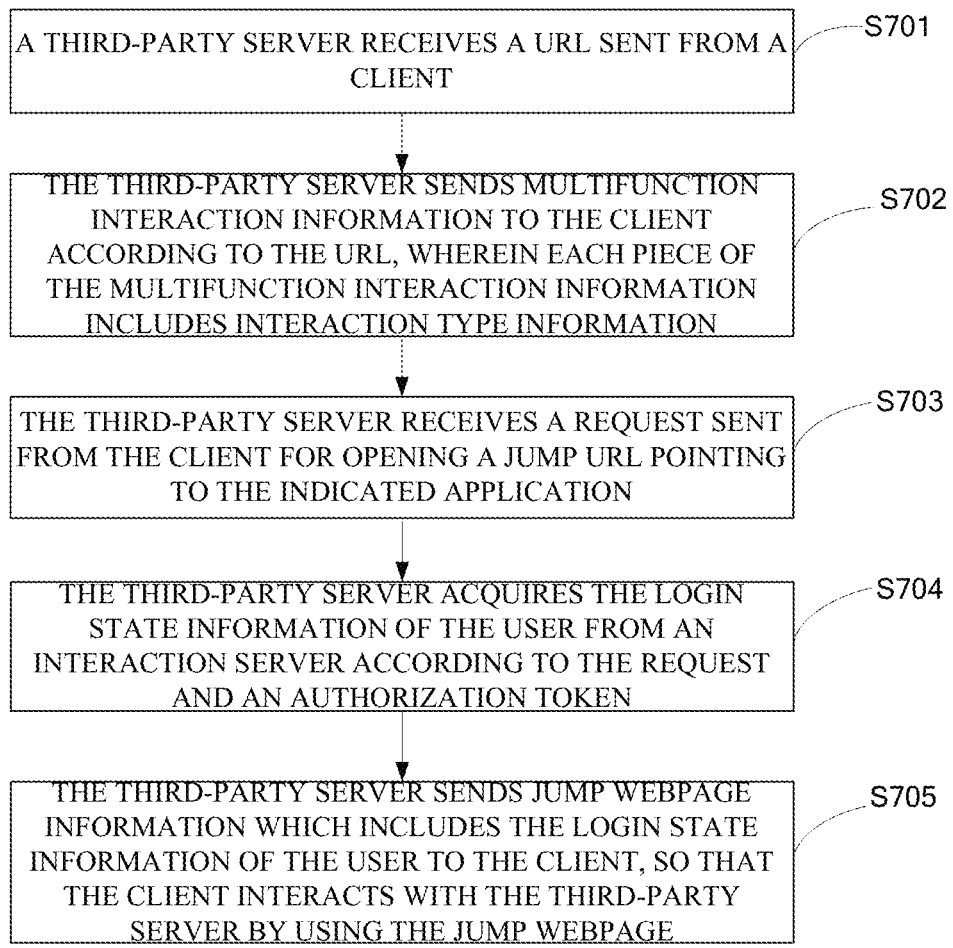
FIG. 7 is a flow chart that illustrates an implementation of an interaction method provided by another embodiment of the present disclosure.

FIG. 7 shows a flow chart of an implementation of an interaction method provided by the eighth embodiment of the disclosure, the detailed description is as follows:

in step S701, a third-party server receives a URL sent from a client;

in step S702, the third-party server sends multifunction interaction information to the client according to the URL, wherein each piece of the multifunction interaction information includes interaction type information.

Alternatively, after step S702, the method may further comprise step 1:

1. The third-party server acquires an authorization token.

Alternatively, before step 1, the method may further comprise:

2. The third-party server acquires an authorization code sent from the client and executes step 1 according to the authorization code.

Alternatively, during steps 1 and 2, the process that the third-party server acquires an authorization token is specified as:

the third-party server acquires an authorization token sent from the interconnection server and forwarded by the client; or the third-party server acquires an authorization token locally generated by the client; or the third-party server acquires an authorization token sent from the interconnection server.

In step S703, the third-party server receives a request for opening a jump URL pointing to the indicated application from the client;

In step S704, the third-party server acquires the client user's login state information from an interconnection server according to the request and an authorization token;

In step S705, the third-party server sends jump webpage information including the client user's login state information to the client, so that the client interacts with the third-party server by using the jump webpage;

wherein, the third-party server and the client have been pre-registered on the interconnection server.

In the present embodiment, when the interaction type information indicates an APP application or a webpage application developed by a third-party, the third-party server receives a request for opening a jump URL pointing to the indicated application from the client; the third-party server acquires the client user's login state information from an interconnection server according to the request and an authorization token; the third-party server sends jump webpage information including the client user's login state information to the client, so that the client interacts with the third-party server by using the jump webpage; so that a QQ client for example may acquire the application or webpage with the login state information.

The Ninth Embodiment

Figure 8:
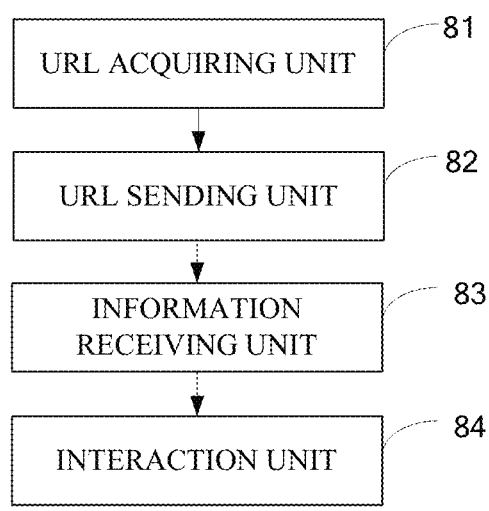
FIG. 8 is a block diagram that illustrates an interaction device provided by another embodiment of the present disclosure.

FIG. 8 is a block diagram of an interaction device provided by the ninth embodiment of the disclosure, and for convenience of description, only parts related to the embodiment of the disclosure are shown. The device may be a software unit, a hardware unit or a combination of them built in a client.

The device includes: a URL acquiring unit 81, a URL sending unit 82, an information receiving unit 83 and an interaction unit 84.

The URL acquiring unit 81 is configured to scan a target two-dimensional code and acquire a URL of the target two-dimensional code at the client;

The URL sending unit 82 is configured to send the URL to an associated third-party server at the client;

The information receiving unit 83 is configured to receive multifunction interaction information returned from the third-party server according to the URL at the client, wherein each piece of the multifunction interaction information includes interaction type information;

The interaction unit 84 is configured for an interaction between the client and the third-party server based on the multifunction interaction information.

The interaction device provided by the embodiment of the disclosure may be utilized in the corresponding method embodiment, i.e., the first embodiment. For details, please refer to the description of the first embodiment, which are not discussed here.

The Tenth Embodiment

Figure 9:
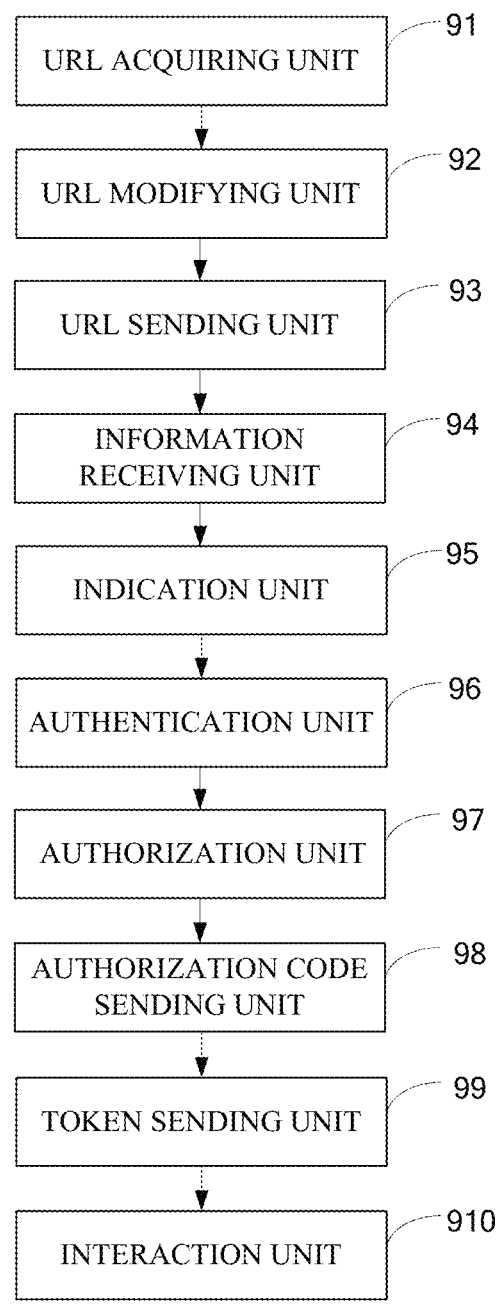
FIG. 9 is a block diagram that illustrates an interaction device provided by another embodiment of the present disclosure.

FIG. 9 is a block diagram of an interaction device provided by the tenth embodiment of the disclosure, and for convenience of description, only parts that are relevant to the embodiment of the disclosure are shown. The device may be a software unit, a hardware unit or a combination of them built in a client.

The device includes: a URL acquiring unit 91, a URL modifying unit 92, a URL sending unit 93, an information receiving unit 94, a indication unit 95, an authentication unit 96, an authorization unit 97, an authorization code sending unit 98, a token sending unit 99 and an interaction unit 910.

The present embodiment differs from the ninth embodiment in that:

Alternatively, the URL modifying unit 92 is configured to add predefined multifunction interaction identifier into the URL at the client, wherein the predefined multifunction interaction identifier is configured to inform the third-party server that the current client supports the multifunction operation;

The URL sending unit 93 is configured to send the URL with the added predefined multifunction interaction identifier to the third-party server at the client; and when the third-party server supports multifunction operation, the information receiving unit 94 is triggered.

Alternatively, the indication unit 95 is configured to display options for selecting one type of interaction to the user, when the multifunction interaction information includes multiple pieces each corresponding to one type of interaction;

The interaction unit 910 is configured for an interaction between the client and the third-party server based on the piece of multifunction interaction information corresponding to the type of interaction selected by the user.

Alternatively, when the interaction type information indicates a system application local to the client or an application developed by the same developer as the client, the interaction unit 910 is further configured to interact with the indicated type of application locally called by the server by the client locally calling the same type of application.

Alternatively, when the interaction type information indicates a system application local to the client or an application developed by the same developer as the client, the interaction unit 910 particularly comprises:

A request sending module 9101, is configured to send a request for opening a jump URL pointing to the indicated application to the third-party server at the client, so that the third-party server may acquire the client user's login state information from an interconnection server based on the request and an authorization token, wherein the third-party server and the client have been pre-registered on the interconnection server A jump webpage information receiving module 9102, is configured to receive and display the jump webpage information including the user's login state information and returned from the third-party server at the client;

An interaction module 9103, is configured to interact with the third-party server according to the jump webpage information at the client;

Alternatively, the interaction information further includes an interaction application identifier and/or a signature file of a third-party server. The device further includes:

The authentication unit 96 is configured to send the interaction application identifier and/or signature file of the third-party to the interconnection server at the client, so that the interconnection server authenticates the third-party according to the interaction application identifier and/or signature file of the third-party.

Alternatively, the authorization unit 97 is configured to receive a prompt for authorization sent from the interconnection server at the client, wherein the prompt for authorization is used for confirming whether the user of the client permits the third-party server to access information of the user stored on the interconnection server; when a confirmation that permits the third-party server to access information of the user stored on the interconnection server is received from the user, the client sends authorization information to the interconnection server.

Alternatively, the authorization code sending unit 98 is configured to send the authorization code to the third-party server at the client, so that the third-party server acquires an authorization token according to the authorization code.

Alternatively, the authorization code sending unit 98 is further configured to receive the authorization code sent from the interconnection server and send the authorization code to the third-party server at the client; or the authorization code sending unit 98 is further configured to locally generate the authorization code and send the authorization code to the third-party server at the client.

Alternatively, the token sending unit 99 is configured to send an authorization token to the third-party server at the client.

Alternatively, the token sending unit 99 is further configured to receive the authorization token sent from the interconnection server and send the authorization token to the third-party server at the client; or the token sending unit 99 is further configured to locally generate the authorization token and send the authorization token to the third-party server at the client.

The interaction device provided by the embodiment of the disclosure may be used in the corresponding method embodiments, namely, the second to the fourth embodiments. For details, please refer to the description of the second to the fourth embodiments, which will not be discussed here.

The Eleventh Embodiment

Figure 10:
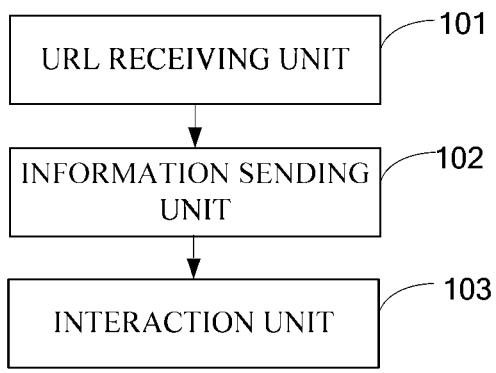
FIG. 10 is a block diagram that illustrates an interaction device provided by another embodiment of the present disclosure.

FIG. 10 is a block diagram of an interaction device provided by the eleventh embodiment of the disclosure, and for convenience of description, only parts that are relevant to the embodiment of the disclosure are shown. The device may be a software unit, a hardware unit or a combination of them built in a third-party server.

The device includes: a URL receiving unit 101, an information sending unit 102 and an interaction unit 103.

The URL receiving unit 101 is configured to receive a URL sent from a client at the third-party server;

The information sending unit 102 is configured to send multifunction interaction information to the client according to the URL at the third-party server, wherein each piece of the multifunction interaction information includes interaction type information;

The interaction unit 103 is configured to interact with the client based on the multifunction interaction information at the third-party server.

Alternatively, the multifunction interaction information includes information about at least one type of interaction application.

The interaction device provided by the embodiment of the disclosure may be used in the corresponding method embodiment, namely, the fifth embodiment. For details, please refer to the description of the fifth embodiment, which will not be discussed here.

The Twelfth Embodiment

Figure 11:
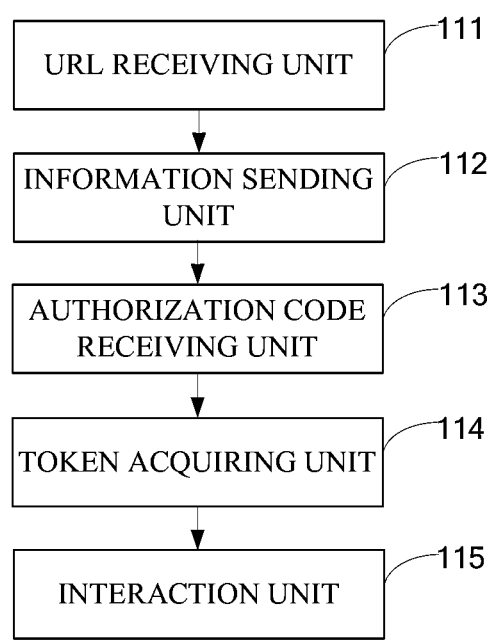
FIG. 11 is a block diagram that illustrates an interaction device provided by another embodiment of the present disclosure.

FIG. 11 is a block diagram of an interaction device provided by the twelfth embodiment of the disclosure, which is configured for the third-party device, and for convenience of description, only parts that is relevant to the embodiment of the disclosure. The device may be a software unit, a hardware unit or a combination of them built in a third-party server.

The device includes: a URL receiving unit 111, an information sending unit 112, an authorization code receiving unit 113, a token acquiring unit 114 and an interaction unit 115.

The present embodiment differs from the eleventh embodiment in that:

Alternatively, the URL receiving unit 111, is particularly used to receive a URL with added predefined multifunction interaction identifier and sent from the client at the third-party server, wherein the predefined multifunction interaction identifier is used to inform the third-party server that the current client supports multifunction operation; when the third-party server supports multifunction operation, the information sending unit 112 is triggered.

Alternatively, when the interaction type information indicates a system application local to the client or an application developed by the same developer as the client, the interaction unit 115 is further configured for the interaction between the third-party server's application of the same type as the interaction application with an application of the same type as the interaction application and locally called by the client.

Alternatively, when the interaction type information indicates an APP application or a webpage application developed by a third-party, the interaction unit 115 includes:

A request receiving module 1151, is configured to receive a request for opening a jump URL pointing to the indicated application at the third-party server, and wherein the request is sent from the client;

A login information acquiring module 1152, is configured to acquire the client user's login state information from an interconnection server according to the request and an authorization token at the third-party server, wherein the third-party server and the client have been pre-registered on the interconnection server;

A webpage information sending module 1153, is configured to send jump webpage information including the client user's login state information to the client at the third-party server, so that the client interacts with the third-party server by using the jump webpage.

Alternatively, the token acquiring unit 114 is configured to acquire an authorization token at the third-party server.

Alternatively, the authorization code receiving unit 113 is configured to receive an authorization code sent from the client at the third-party server, and the token acquiring unit 114 is triggered based on the authorization code.

Alternatively, the token acquiring unit 114 is further configured by the third-party server to receive an authorization token sent from the interconnection server and forwarded by the client; or to receive an authorization token locally generated and sent by the client; or to receive an authorization token sent from the interconnection server.

The interaction device provided by the embodiment of the disclosure may be used in the corresponding method embodiments, namely, the sixth to the eighth embodiments. For details, please refer to the description of the sixth to the eighth embodiments, which will not be discussed here.

Figure 12:
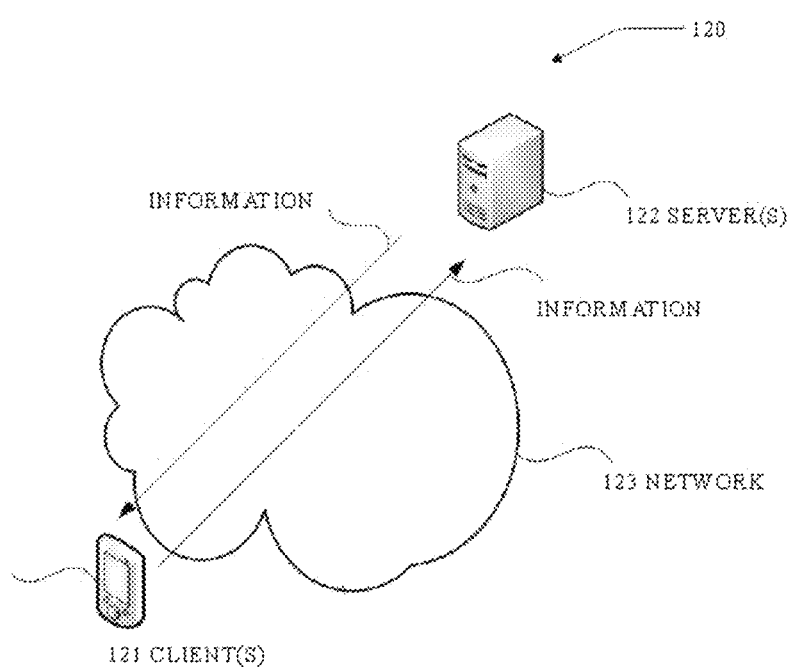
FIG. 12 illustrates an interaction system according to the present disclosure.

Now turning to FIG. 12, an interaction system 120 is shown according to the present disclosure. The interaction system 120 includes one or more client(s) 121, such as a mobile/cellular phone, a desktop computer, a laptop computer, a tablet computer, and the like. The interaction system 120 further includes one or more server(s) 122. The one or more client(s) 121 may interact with the one or more server(s) 122 via network 123. Though only one client and one server are shown in FIG. 12, those skilled in the art will appreciate that any number of clients and servers may be included in system 120. The network 123 may be any type of network, e.g., any combination of Internet, intranet, local area network (LAN), wide area network (WAN), wired network, wireless network, etc. The client may transmit information to or receive information from the server over the network.

The above interaction system may implement the interaction method described by the present disclosure. For details, please refer to the corresponding embodiments, which will not be discussed here.

It should be noted that, each unit described in the above embodiments is simply divided by the functional logic, but not limited to the above divisions, as long as the corresponding functions can be realized; additionally, the name of each functional unit is only used for distinguishing from each other, and not intended to limit the protection scope of the disclosure.

Additionally, those skilled in the art can understand that all or part of the steps for implementing the methods of the above embodiments can be performed via the programs to instruct corresponding hardware. The corresponding programs can be stored in a computer readable storage medium, which may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices.

The above description only shows several preferred implementations of the disclosure, and cannot be used to limit the disclosure. Any modification, equivalent replacement and improvement within the spirit and principle of the disclosure, should be included in the protection scope of the disclosure.

What is claimed is:

1. An interaction method, comprising:
scanning, implemented by a processor of a client, a target two-dimensional code to acquire a URL in the target two-dimensional code;
sending, implemented by the processor of the client, the URL to a third-party server;
receiving, implemented by the processor of the client, multifunction interaction information that is returned from the third-party server according to the URL, wherein each piece of the multifunction interaction information includes interaction type information that indicating an interaction manner between the client and the third-party server; and
interacting, implemented by the processor of the client, with the third-party server based on the multifunction interaction information,
wherein the interaction type information indicates one or more members of the group consisting of a system application local to the client, an application developed by the same developer as the client, a webpage application and APP application developed by a third party, and
wherein, when the interaction type information indicates a system application local to the client or an application developed by the same developer as the client, the interacting, implemented by the processor of the client, with the third-party server based on the multifunction interaction information comprising interacting, implemented by the processor of the client, with the indicated type of application locally called by the server by locally calling the same type of application.

2. The method according to claim 1, wherein, after said receiving, implemented by the processor of the client, multifunction interaction information that is returned from the third-party server according to the URL, the method further comprises:
displaying, implemented by the processor of the client, options for selecting one type of interaction by a user when the multifunction interaction information includes multiple pieces each corresponding to one type of interaction;

wherein the interacting, implemented by the processor of the client, with the third-party server based on the multifunction interaction information comprises:

interacting, implemented by the processor of the client, with the third-party server based on the piece of multifunction interaction information corresponding to the type of interaction selected by the user.

3. The method according to claim 1, wherein, after said scanning, implemented by the processor of the client, a target two-dimensional code to acquire a URL in the target two-dimensional code, the method further comprises:

adding, implemented by the processor of the client, a predefined multifunction interaction identifier into the URL, wherein the predefined multifunction interaction identifier is configured to inform the third-party server that the client supports multifunction operation;

wherein the sending, implemented by the processor of the client, the URL to a third-party server comprises:

sending, implemented by the processor of the client, the URL with the added predefined multifunction interaction identifier to the third-party server, and the multifunction interaction information is returned when the third-party server supports multifunction operation.

4. The method according to claim 1, wherein, when the interaction type information indicates an APP application or a webpage application developed by a third-party, the interacting, implemented by the processor of the client, with the third-party server based on the multifunction interaction information comprises:

sending, implemented by the processor of the client, to the third-party server a request for opening a jump URL pointing to the indicated application, so that the third-party server acquires a login state of the user of the client from an interconnection server according to the request and an authorization token;

receiving and displaying, implemented by the processor of the client, a jump webpage, which contains the login state of the user of the client, returned from the third-party server; and interacting, implemented by the processor of the client, with the third-party server by using the jump webpage;

wherein the third-party server and client have been pre-registered on the interconnection server.

5. The method according to claim 4, wherein the multifunction interaction information further includes an interaction application identifier and/or a signature file of a third-party; after the receiving, implemented by the processor of the client, multifunction interaction information that is returned from the third-party server according to the URL, the method further comprises:

sending, implemented by the processor of the client, the interaction application identifier and/or signature file of the third-party to the interconnection server, so that the interconnection server authenticates the third-party according to the interaction application identifier and/or signature file of the third-party.

6. The method according to claim 4, wherein, before the interacting, implemented by the processor of the client, with the third-party server based on the multifunction interaction information, the method further comprises:

receiving, implemented by the processor of the client, a prompt for authorization sent from the interconnection server, wherein the prompt is used for confirming whether the user of the client permits the third-party server to access information of the user stored on the interconnection server;

sending, implemented by the processor of the client, an authorization confirmation to the interconnection server when a confirmation that permits the third-party server to access information of the user stored on the interconnection server is received.

7. The method according to claim 4, wherein, after the receiving, implemented by the processor of the client, multifunction interaction information that is returned from the third-party server according to the URL, the method comprises:

sending, implemented by the processor of the client, an authorization token to the third-party server.

8. The method according to claim 7, wherein, the sending, implemented by the processor of the client, an authorization token to the third-party server comprises:

receiving, implemented by the processor of the client, the authorization token sent from the interconnection server, and sending, implemented by the processor of the client, the authorization token to the third-party server; or generating locally and sending, implemented by the processor of the client, the authorization token to the third-party server.

9. The method according to claim 7, wherein, before the sending, implemented by the processor of the client, the authorization token to the third-party server, the method further comprises:

sending, implemented by the processor of the client, an authorization code to the third-party server, so that the third-party server acquires the authorization token according to the authorization code.

10. The method according to claim 9, wherein, the sending, implemented by the processor of the client, an authorization code to the third-party server comprises:

receiving, implemented by the processor of the client, the authorization code sent from the interconnection server, and sending, implemented by the processor of the client, the authorization code to the third-party server; or generating locally and sending, implemented by the processor of the client, the authorization code to the third-party server.

11. An interaction method, comprising:

receiving, implemented by a processor of a third-party server, a URL sent from a client;

sending, implemented by the processor of the third-party server, multifunction interaction information to the client according to the URL, wherein each piece of the multifunction interaction information includes interaction type information that indicating an interaction manner between the client and the third-party server; and interacting, implemented by the processor of the third-party server, with the client based on the multifunction interaction information, wherein the interaction type information indicates one or more members of the group consisting of a system application local to the client, an application developed by the same developer as the client, a webpage application and an APP application developed by a third party, wherein when the interaction type information indicates a system application local to the client or an application developed by the same developer as the client, the interacting, implemented by the processor of the third-party server, with the client based on the multifunction interaction information comprising:
  interacting, implemented by the processor of the third-party server, with the indicated type of application locally called by the client by locally calling the same type of application.

12. The method according to claim 11, wherein, the receiving, implemented by the processor of a third-party server, a URL sent from a client comprises:
  receiving, implemented by the processor of the third-party server, the URL with added predefined multifunction interaction identifier sent from the client, wherein the predefined multifunction interaction identifier is used to inform the third-party server that the client supports multifunction operation, and when the third-party server supports multifunction operation, the third-party server sends multifunction interaction information to the client based on the URL.

13. The method according to claim 11, wherein when the interaction type information indicates an APP application or a webpage application developed by a third-party, the interacting, implemented by the processor of the third-party server, with the client based on the multifunction interaction information comprising:
  receiving, implemented by the processor of the third-party server, a request from the client for opening a jump URL pointing to the indicated application;
  acquiring, implemented by the processor of the third-party server, login state of the user of the client from an interconnection server according to the request and an authorization token;
  sending, implemented by the processor of the third-party server, to the client a jump webpage, which contains the login state of the user of the client, so that the client interacts with the third-party server by using the jump webpage;
  wherein the third-party server and the client have been pre-registered on the interconnection server.

14. The method according to claim 13, wherein, after sending, implemented by the processor of the third-party server, multifunction interaction information to the client based on the URL, the method further comprises:
  acquiring, by the processor of the third-party server, an authorization token.

15. The method according to claim 14, wherein before acquiring, implemented by the processor of the third-party server, the authorization token, the method further comprises:
  receiving, implemented by the processor of the third-party server, the authorization code sent from the client, and
  acquiring, implemented by the processor of the third-party server, the authorization token according to the authorization code.

16. The method according to claim 14, wherein the acquiring, implemented by the processor of the third-party server, an authorization token comprises:
  receiving, implemented by the processor of the third-party server, the authorization token sent by the interconnection server and then forwarded by the client; or
  receiving, implemented by the processor of the third-party server, the authorization token locally generated and sent by the client; or
  receiving, implemented by the processor of the third-party server, the authorization token sent from the interconnection server.

17. A client comprising a processor, the processor functions as:
  a URL acquiring unit, configured to scan a target two-dimensional code and acquire a URL from the target two-dimensional code;
  a URL sending unit, configured to send the URL to a third-party server;
  an information receiving unit, configured to receive multifunction interaction information that is returned from the third-party server according to the URL, wherein each piece of the multifunction interaction information includes interaction type information that indicating an interaction manner between the client and the third-party server; and
  an interaction unit, configured to interact with the third-party server based on the multifunction interaction information,
  wherein the interaction type information indicates one or more members of the group consisting of a system application local to the client, an application developed by the same developer as the client, a webpage application and an APP application developed by a third party, and
  wherein the interaction unit is configured to interact with the third-party server by interacting with the indicated type of application locally called by the server by locally calling the same type of application when the interaction type information indicates a system application local to the client or an application developed by the same developer as the client.

18. The client according to claim 17, wherein the processor further functions as:
  an indication unit, configured to display options for selecting one type of interaction by a user when the multifunction interaction information includes multiple pieces each corresponding to one type of interaction;
  wherein the interaction unit interacts with the third-party server, based on the piece of multifunction interaction information corresponding to the type of interaction selected by the user.

* * * * *